(12) United States Patent
Trinchieri

(10) Patent No.: US 11,560,906 B2
(45) Date of Patent: Jan. 24, 2023

(54) COMBINED VALVE, POWER UNIT BODY AND HYDRAULIC POWER UNIT

(71) Applicant: Dana Motion Systems Italia S.r.l., Reggio Emilia (IT)

(72) Inventor: Piergiorgio Trinchieri, Reggio Emilia (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 58 days.

(21) Appl. No.: 17/303,899

(22) Filed: Jun. 10, 2021

(65) Prior Publication Data

US 2021/0404487 A1 Dec. 30, 2021

(30) Foreign Application Priority Data

Jun. 29, 2020 (DE) ...................... 20 2020 103 750.1

(51) Int. Cl.
*F15B 13/02* (2006.01)
*F16K 17/04* (2006.01)
*F15B 11/10* (2006.01)
*F16K 17/196* (2006.01)

(52) U.S. Cl.
CPC ............ *F15B 13/024* (2013.01); *F15B 11/10* (2013.01); *F15B 13/027* (2013.01); *F16K 17/048* (2013.01); *F16K 17/196* (2013.01); *F15B 2211/20515* (2013.01); *F15B 2211/30505* (2013.01); *F15B 2211/365* (2013.01); *F15B 2211/50518* (2013.01); *F15B 2211/55* (2013.01); *F16K 17/0473* (2013.01)

(58) Field of Classification Search
CPC ...... F15B 11/10; F15B 13/024; F15B 13/027; F15B 13/042; F15B 13/044; F16K 17/048
See application file for complete search history.

(56) References Cited

U.S. PATENT DOCUMENTS

| 6,029,448 | A | * | 2/2000 | Hobson | F15B 11/0423 |
| | | | | | 417/42 |
| 10,487,854 | B2 | * | 11/2019 | Schneider | F15B 1/04 |
| 10,724,553 | B2 | * | 7/2020 | Zammuto | F15B 11/0426 |
| 2017/0298963 | A1 | * | 10/2017 | Linjie | F15B 15/18 |

FOREIGN PATENT DOCUMENTS

DE 202020103749 U1 * 11/2021 ............. F16F 1/125

* cited by examiner

*Primary Examiner* — Michael Leslie
(74) *Attorney, Agent, or Firm* — Marshall & Melhorn, LLC

(57) ABSTRACT

A combined valve for insertion into an elongated bore of a power unit body of a hydraulic power unit may have an elongated carrier for receiving a relief and a check valve. The valve may also have a register arranged at a first axial position of a longitudinal axis of the carrier for calibration of the relief valve. The valve may also have a check valve coupled to the carrier at a second axial position along the longitudinal axis of the carrier. The valve may also have a relief valve coupled to the carrier at a third axial position along the longitudinal axis of the carrier. A minimal distance between the first and the second axial position may be less than a minimal distance between the first and the third axial position.

10 Claims, 3 Drawing Sheets

COMBINED VALVE, POWER UNIT BODY AND HYDRAULIC POWER UNIT

BACKGROUND

The present disclosure primarily relates to a combined valve for controlling pressure in hydraulic systems, to a power unit body comprising a corresponding combined valve and to a hydraulic power unit comprising a corresponding power unit body. The hydraulic power unit may find application in vehicles comprising valve assemblies for controlling pressure in hydraulic systems, e.g. lift trucks having a lift drive.

Combined valves comprising a relief valve and a check valve are known from the prior art. Typically, a relief valve comprises a helical compression spring being adjustable via a register. To enable calibration by turning the register, the register is preferably located at an accessible end of the combined valve. Therefore, along a longitudinal axis of the combined valve, the helical spring is arranged adjacent to the register and the check valve is, with regard to the register, typically arranged behind the relief valve.

Such a combined relief and check valve to be inserted into a power unit body of a hydraulic power unit may require relatively complex hydraulic circuit channels within the power unit body. This leads to complex components and high costs in production and assembly.

SUMMARY

It is an object of the present invention to develop a combined valve solving the aforementioned problem. Further, it is an object of the present invention to provide a power unit body and a hydraulic power unit addressing the aforementioned problem.

The object may be achieved by a combined valve with the features of the main claim as well as by a power unit body and a hydraulic power unit with the features of the auxiliary claims. Advantageous designs and further developments of the invention are to be deduced from the features of the dependent claims and the following description.

A combined valve for insertion into an elongated bore of a power unit body of a hydraulic power unit is provided.

The combined valve comprises
- an elongated carrier for receiving a relief and a check valve.
- a register arranged at a first axial position of a longitudinal axis of the carrier for calibration of the relief valve;
- a check valve coupled to the carrier at a second axial position along the longitudinal axis of the carrier; and
- a relief valve coupled to the carrier at a third axial position along the longitudinal axis of the carrier.

A minimal distance between the first and the second axial position is less than a minimal distance between the first and the third axial position.

Typically, a check valve is a one-way valve, allowing a passage of fluid in only one direction and preventing backflow. There are a large variety of variants of check valves. For example, a wing and wafer or tilting disc check valve stops reverse flow with a flap that swings onto a seat; and a piston and spring check valve comprises a spring loaded piston that can stop a flow. Another preferred check valve is a ball check valve. The ball check valve may comprise a closing member, the movable part to block the flow being a ball. In some ball check valves, the ball is spring-loaded.

Preferably, the check valve of the present application is a piston check valve, a disc check valve or a ball check valve or a combination thereof. Alternatively or additionally, however, the check valve may comprise another type of check valve.

The relief valve is typically a safety valve used to control or limit a pressure in a system. A relief valve is typically designed such that the relief valve opens and allows fluid to pass when pressure exceeds a threshold value. The relief valve may comprise a compressible contrast spring, in particular a helical spring. However, the relief valve may comprise other types of springs, for example, torsion springs, air springs, gas springs, disc springs, volute springs or the like. Preferably, the relief valve comprises a helical compression spring comprising helically coiled wires designed to provide an opposing force when compressed. Under increasing load, the space between coils may close until the spring's compressed length is reached, when the coils touch. The register may be configured to compress and/or decompress the contrast spring.

In one embodiment, the register is rotatable with respect to the contrast spring. Alternatively or additionally, at least one part of the carrier is rotatable with respect to the contrast spring. The register and/or at least one part the carrier may be rotationally fixed to the contrast spring such that a rotation of the register and/or a rotation of at least one part of the carrier causes a rotation of the contrast spring.

A rotation of the register and/or the carrier in a first direction may compress the contrast spring while a rotation in an opposite direction may decompress the contrast spring.

The register may comprise a turning member, for example a screw, in particular screw head. The turning member may be fixed to the carrier such that a rotation of the turning member leads to a rotation of the carrier or a part of the carrier. Preferably, the rotatable carrier or a rotatable part of the carrier may apply a pressure to the contrast spring for compression. In another embodiment, the turning member is rotatably fixed to the carrier and the register further comprises a transmission element applying a pressure onto the contrast spring when the turning member is turned in the first direction.

The elongated carrier has a longitudinal axis. The carrier may have an essentially rotationally symmetric shape with respect to rotation about its longitudinal axis. The elongated carrier may comprise two or more fixedly coupled parts. Alternatively, the carrier may comprise an integrally formed body.

In one embodiment, the check valve comprises an actuator port; the relief valve comprises a tank port; and the check valve and the relief valve have a common pressure port located between the actuator port and the tank port.

The actuator port may be configured to be fluidly connected to an actuator, for example to a hydraulic cylinder. The pressure port may be configured to be fluidly connected to a hydraulic drive, in particular a pump. The tank port may be configured to be fluidly connected to a tank, in particular a fluid reservoir.

In one embodiment, the actuator port, the pressure port and the tank port are arranged along an axis parallel to the longitudinal axis of the combined valve. Alternatively, only two of these ports may be arranged along an axis parallel to the longitudinal axis of the combined valve, while one of these ports may be arranged differently, in particular arranged in a plane essentially perpendicular to a plane defined by the longitudinal axis and the axis parallel to the longitudinal axis. Alternatively, only two of these ports may be arranged along an axis in parallel to the longitudinal axis of the combined valve, while one of these ports may be arranged differently, in particular arranged in the same plane defined by the longitudinal axis and the axis in parallel to the longitudinal axis, but further arranged on an opposite side of the longitudinal axis.

The check valve may be configured to allow a fluid to flow from the pressure port to the actuator port. The relief valve may be configured to allow a fluid to flow from the pressure port to the tank port once a predetermined pressure is exceeded. The relief valve may comprise a sealable passage and a movable poppet. In a first position, the movable poppet may seal the passage. In a second position, the poppet may open the passage to allow a fluid to pass. The poppet may be attached to the contrast spring, in particular such that the poppet may be in the first position when the contrast spring is decompressed and the poppet may be in the second position when the contrast spring is decompressed. In this configuration, the contrast spring may be compressed when a pressure at the pressure port exceeds a predetermined value. The predetermined value may be adjusted via the register. The predetermined value may be determined by a spring characteristic curve of the contrast spring. The spring characteristic curve may be set by characteristics of the spring such a spring rate, helix type, spring ends type, wire diameter, material, diameter of the spring, and length of the spring.

In one embodiment, the carrier comprises a mounting area for mounting on a power unit, in particular an external thread.

Further, the present disclosure relates to a power unit body for a hydraulic power unit. Such a power unit body may comprise a first elongated bore extending from a first surface of the power unit body to receive the combined valve described above. The first elongated bore may comprise an internal thread such that a combined valve may be screwed at least partially into the first elongated bore. The combined valve may comprise a stop, for example a flange or a protrusion, to restrict how deep the valve can be inserted into the bore.

The first elongated bore may extend essentially perpendicularly from the first surface of the power unit body. Additionally or alternatively, the power unit body may comprise a flange or collar surrounding the edge of the first elongated bore.

The power unit body may further comprise the combined valve according to one of the above described embodiments, arranged at least partially in the first elongated bore.

The power unit may further comprise a first, a second and a third bore, each extending from a second surface of the power unit body. The first bore may form a first conduit connecting the actuator port of the combined valve with the second surface of the power unit body. The second bore may form a second conduit connecting a pressure port of the combined valve with the second surface of the power unit body. In another embodiment, the second bore may form a second conduit connecting a pressure port of the combined valve with a third surface of the power unit body. The third bore may form a third conduit connecting the tank port of the combined valve with the second surface of the power unit body.

In one embodiment, the first bore, the second bore and the third bore are arranged in parallel to one another. The first conduit, the second conduit and the third conduit may be arranged in parallel to one another.

In another embodiment, the first and the third bore may be arranged in parallel while the second bore may be arranged essentially perpendicular to the first and the third bore. In this embodiment, the second conduit may be arranged essentially perpendicular to the first and third conduit. The second conduit may connect a pressure port with a third surface of the power unit body. Thus, a pump may be arranged at the third surface and the pressure port may be connected to the pump via the second conduit.

In one embodiment, the power unit body may comprise a second elongated bore. The second elongated bore may extend from the first surface of the power unit body, preferably extending essentially in parallel to the first elongated bore. Alternatively, the second elongated bore may extend from the third surface of the power unit body or a fourth surface of the power unit body. The fourth surface of the power unit body may be arranged opposite to the first surface of the power unit body.

The power unit body may comprise a further valve, preferably a solenoid valve, arranged at least partially in the second elongated bore.

In one embodiment, the first bore may extend into the second elongated bore. Alternatively or additionally, the third bore may extend into the second elongated bore.

The aforementioned elongated bores and/or the aforementioned first, second and/or third bores may comprise stepped areas with various diameters. Additionally or alternatively, the elongated bores and/or the bores may comprise curves and/or bend areas. In a preferred embodiment, the aforementioned elongated bores and/or the aforementioned first, second and/or third bores may be straight for simplifying a manufacturing process of the power unit body.

The carrier of the combined valve may be rotatably arranged in the first elongated bore. A rotation of the turning member may lead to a rotation of at least a part of the carrier. As described above, this may lead to a compression or decompression of the contrast spring of the combined valve.

Further, the present disclosure relates to a hydraulic power unit comprising the power unit.

In addition, the hydraulic power unit may comprise a tank fluidly connected to the tank port of the combined valve. The hydraulic power unit may further comprise a movable cylinder fluidly connected to the actuator port of the combined valve and a pump. The pump may be fluidly connected to the pressure port of the combined valve and to the tank, wherein the pump is configured to pump a fluid for controlling a movement of the cylinder. The hydraulic power unit may comprise an electric motor drivingly connected to the pump for driving the pump.

DESCRIPTION OF THE FIGURES

Further objects, advantages, and features will become more apparent upon reading of the following non-restrictive description of illustrative embodiments thereof, given by way of example only with reference to the accompanying drawings.

In the appended drawings.

DETAILED DESCRIPTION

Figure 1:
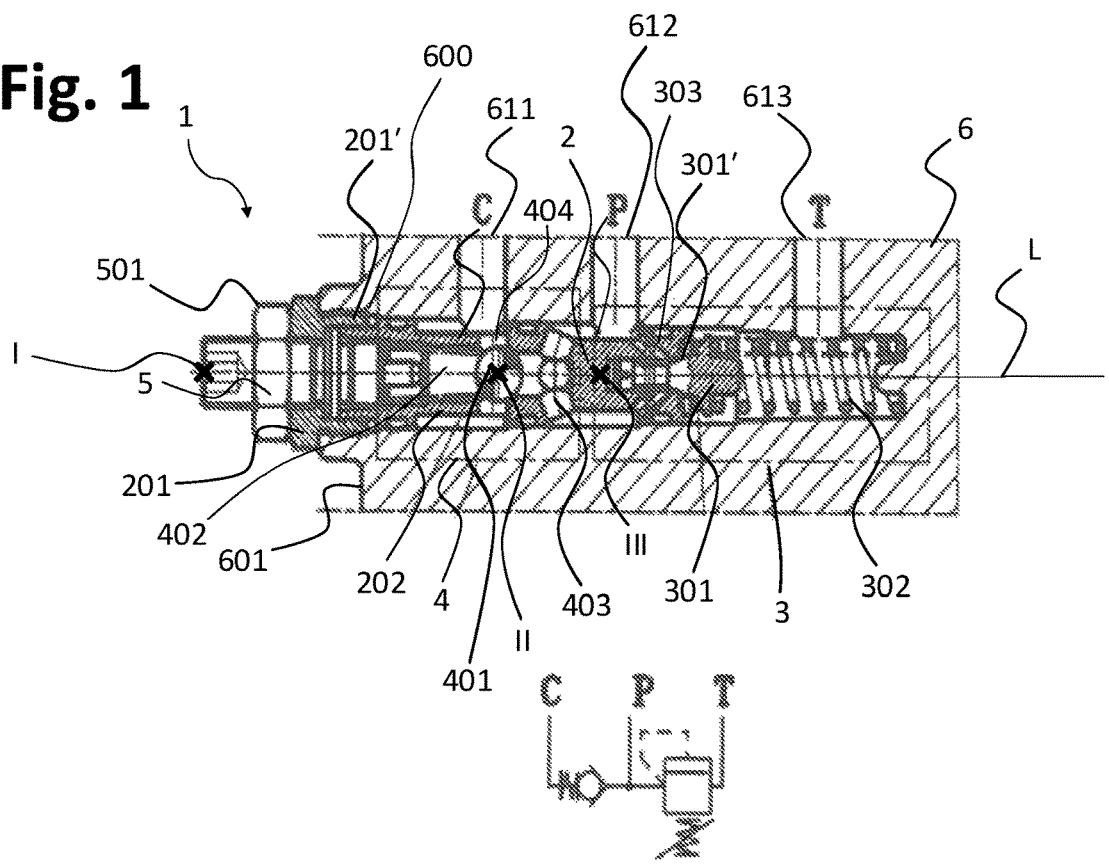
FIG. 1 is a sectional view taken along a longitudinal axis of a combined valve showing a section of a power unit body according to FIG. 2, comprising a combined valve.

FIG. 1 shows a combined valve 1 in a sectional view taken along a longitudinal axis L of the combined valve 1.

The combined valve 1 comprises an elongated carrier 2, a relief valve 3 and a check valve 4. The relief valve 3 comprises a poppet 301 movably connected to the carrier 2. The poppet 301 may be moved between a first position and a second position along the longitudinal axis. In the first position, the poppet 301, in particular a coned part 301' of the poppet 301, seals an inlet conduit 303 of the relief valve 3. In a second position of the poppet 301, the inlet conduit 303 is opened to allow a fluid to pass. The relief valve 3 further comprises a helical contrast spring 302 coupled to the poppet 301. In the first position of the poppet 301, the spring is in a decompressed state. In the second position of the poppet 301 the spring 302 is in a compressed state. The relief valve 3 comprises a pressure port P and a tank port T. When the inlet conduit 303 is open, the pressure port P and the tank port T are fluidly connected. When a fluid pressure in the inlet conduit 303 exceeds a predetermined value, the fluid applies a force to the poppet 301 compressing the spring 302. The compression of the spring 302 leads to a movement of the poppet from the first into the second position, thereby opening the inlet conduit 303 such that the fluid flows from the pressure port P to the tank port T. The predetermined value typically is at least 150 bar, preferably at least 180 bar, particularly preferably at least 220 bar. The predetermined value typically is at most 350, preferably at most 300 bar, particularly preferably at most 250 bar.

The check valve 4 comprises a ball 401 arranged movably in a valve cavity 402. Further, the check valve comprises an inlet 403 and an outlet 404 fluidly connected to the valve cavity 402. The inlet 403 is fluidly connected to the pressure port P. The outlet 404 is fluidly connected to an actuator port C. The check valve 4 is configured to allow a fluid to pass from the inlet 403 to the outlet 404, while a reverse flow is blocked by the ball 401. When fluid is flowing from the pressure port P to the actuator port C, the ball 401 is in an open first position. When a fluid is entering the outlet 404, the ball 404 is moved to a closed second position such that a passage is blocked.

The combined valve 1 further comprises a register 5 coupled to carrier 2. In the shown example, the register comprises a screw part 501 screwed into a first part 201 of the carrier 2. The register 5 is fixedly coupled to a second part 202 of the carrier 2 such that a rotation of the register 5 leads to a rotation of the second part 202 of the carrier 2 with respect to the first part 201 of the carrier 2. Further, a rotation of the register 5 in a first direction leads to a translational movement of the second part of carrier 202 and the coupled poppet 301, thereby compressing the spring 302. A rotation of the register 5 in a second direction opposite to the first direction, leads to a translational movement of the second part of carrier 202 and the coupled poppet 301, thereby decompressing the spring 302. When the register 5 is rotated, the spring 302 may also rotate. In another embodiment, the spring 302 is attached rotatably to the poppet 301 and/or the poppet 301 is attached rotatably to the carrier 2 such that the carrier 2 rotates with respect to the spring 302 when the register 5 is rotated.

The register 5 is arranged at a first axial position I along the longitudinal axis L of the combined valve 1. In FIG. 1, the first axial position I is, for example, defined by the most exterior left axial position of the register. The check valve 4 is coupled to the carrier 2 at a second axial position II along the longitudinal axis L of the carrier 2. In FIG. 1, the second axial position II is defined, for example, by the axial position of the centre point of the ball 401. The relief valve 3 coupled to the carrier 2 at a third axial position III along the longitudinal axis L of the carrier 2. In FIG. 1, the third axial position III is defined, for example, by the most exterior left position of the poppet III.

A minimal distance between the first axial position I and the second axial position II is less than a minimal distance between the first axial position I and the third axial position III. Thus, with regard to FIG. 1, the order of arrangement along the longitudinal axis, from the left to the right, is as follows: register, check valve, relief valve.

The check valve 4 and the relief valve 3 have the common pressure port P located between the actuator port C and the tank port T. The actuator port, the pressure port and the tank port are arranged along an axis in parallel to the longitudinal axis L of the combined valve 1.

Figure 2:
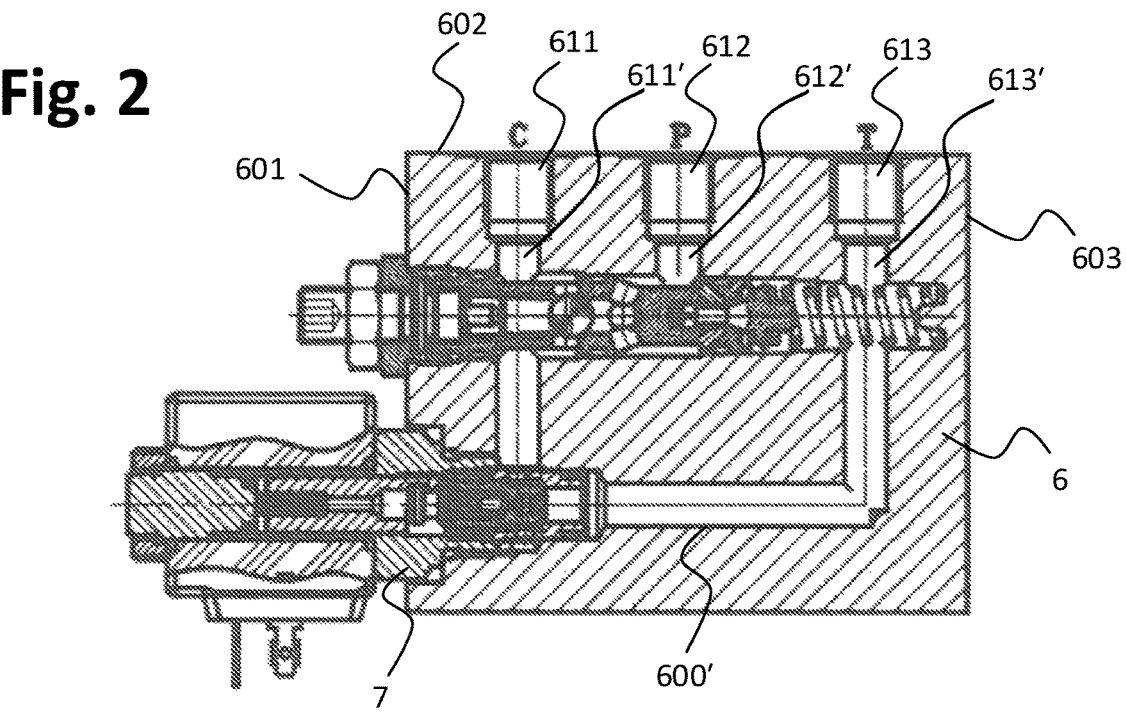
FIG. 2 is a sectional view of a power unit body comprising a combined valve according to FIG. 1, the sectional view being taken along a longitudinal axis of the combined valve.

In FIG. 2, a power unit body 6 is shown, comprising the combined valve 1 of FIG. 1.

The carrier 2, in particular the first part 201 of the carrier 2, comprises a mounting area 201' for mounting the combined valve on the power unit body 6. In the shown embodiment, the mounting area 201' is an external thread. The power unit body 6 comprises a first elongated bore 600 extending from a first surface 601 of the power unit body 6, preferably extending essentially perpendicularly from the first surface 601 of the power unit body 6.

The power unit body 6 comprises a first bore 611, a second bore 612 and a third bore 613, each extending from a second surface 602 of the power unit body 6.

The combined valve 1 is arranged in the first elongated bore 601 such that the inlet 403 and the inlet 303 are associated with the pressure port P. The outlet 404 is associated with the actuator port C. An outlet of the relief valve 3 is associated with the tank port T. The first bore forms a first conduit 611' connecting the actuator port C of the combined valve 1 with the second surface 602 of the power unit body 6. The second bore 612 forms a second conduit 612' connecting the pressure port P of the combined valve with the second surface 602 of the power unit body 6. The third bore 613 forms a third conduit 613' connecting the tank port T of the combined valve 1 with the second surface 602 of the power unit body 6.

The first bore 611, the second bore 612 and the third bore 613 are arranged in parallel to one another. The first surface 601 and the second surface 602 are essentially perpendicular to one another. A second elongated bore 600' extends from the first surface 601 of the power unit body 6. The second elongated bore 600' extends essentially in parallel to the first elongated bore 600. A solenoid valve 7 is arranged at least partially in the second elongated bore 600'. The first bore 611 and the third bore 613 extend into the second elongated bore 600' such that the solenoid valve 7 is fluidly connected to the actuator port C and the tank port T.

Figure 3:
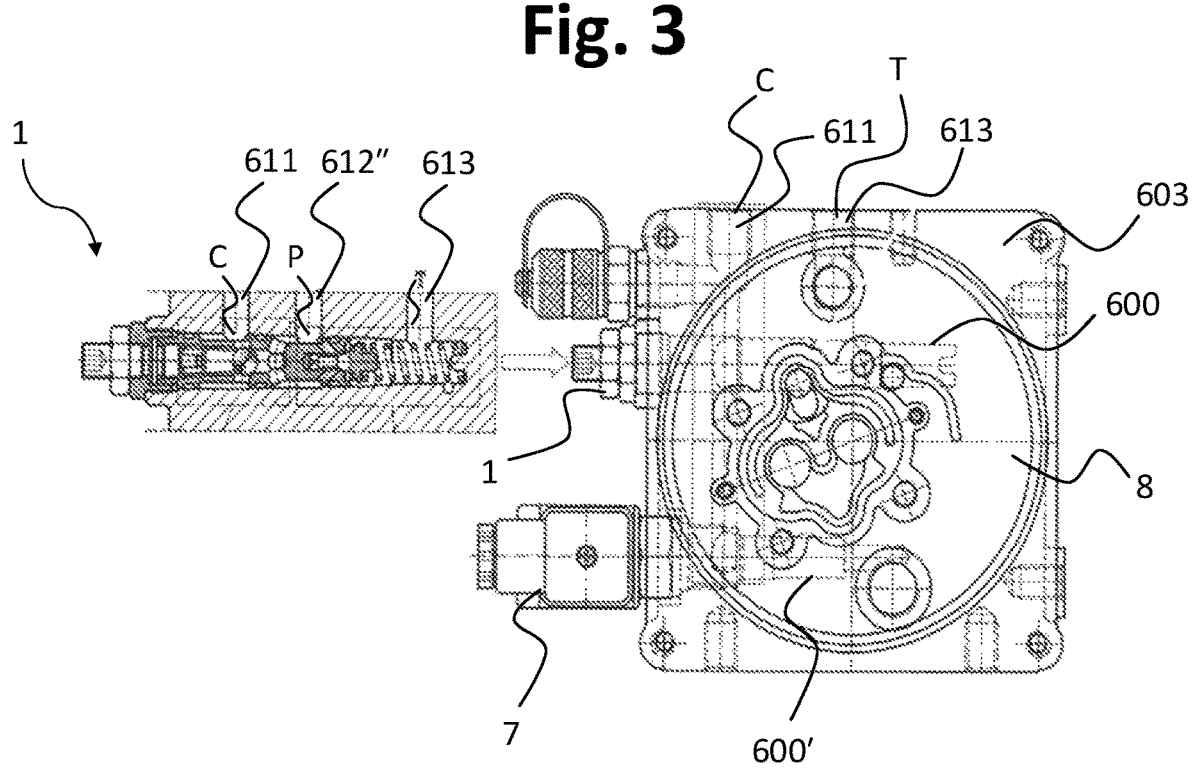
FIG. 3 shows a schematic view of a power unit body.

FIG. 3 shows a schematic view of a power unit body 6 essentially similar to the power unit body 6 of FIG. 2, wherein the second bore 612" is arranged essentially perpendicular to the first bore 611 and third bore 612. The second bore 612" forms a second conduit 612''' connecting the third surface 603 with the pressure port P of the combined valve. A hydraulic pump 8 may be arranged at the third surface 603 of the power unit 6. An outlet of the pump 8 may be associated with the pressure port P.

Figure 4:
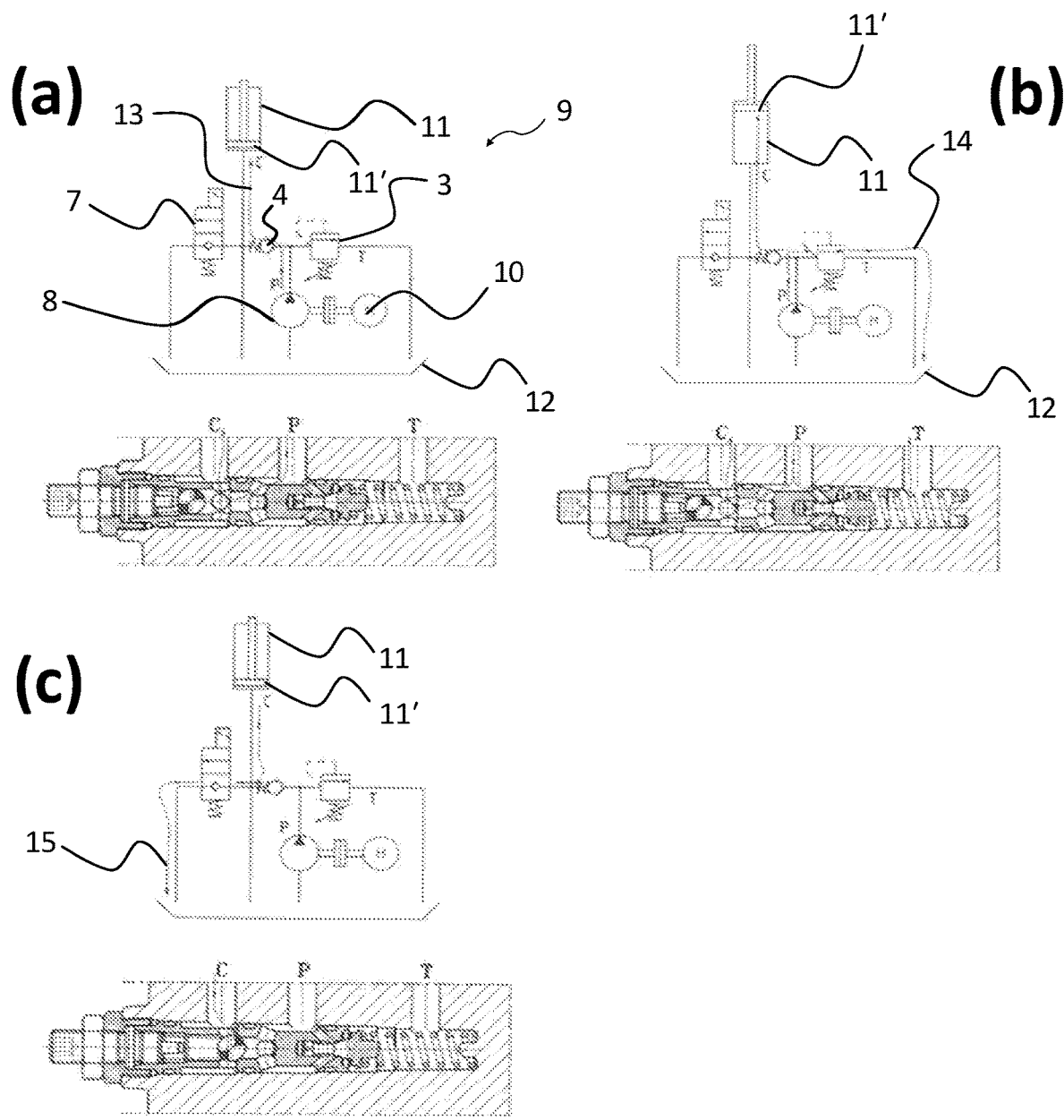
FIG. 4 is a schematic view of a hydraulic power unit.

FIG. 4 shows a schematic view of a hydraulic power unit 9 comprising a power unit body 6 of FIG. 2 or 3, the power unit body 6 comprising a combined valve 1 according to FIG. 1 and a solenoid valve 7. An electric Motor 10 is drivingly connected to the pump 8. The hydraulic power unit 9 further comprises a cylinder 11 fluidly connected to the check valve 4, a tank 12 and the solenoid valve 7. The pump 8 is connected to the tank 12 and is configured to pump a fluid through the check valve 4 to the cylinder 11 for moving a piston of the cylinder upwards, as depicted by arrow 13 in FIG. 4 (a). When the piston 11' is in the upward position, as shown in FIG. 4 (b), a pressure in the inlet 303 may exceed a predetermined value such that the relief valve opens and the fluid may pass the relief valve 3 for flowing into the tank 12, as depicted by arrow 14. The pressure in the cylinder 11 may be controlled via the solenoid valve 7. When the solenoid valve 7 is opened, the fluid may pass through the solenoid valve 7 and into the tank 12, and the piston 11' is moved downwards, as depicted by arrow 15 in FIG. 4 (c).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features.

REFERENCE NUMERALS 1 combined valve
2 carrier
201 first part
201' mounting area
202 second part
3 relief valve
301 poppet
302 spring
303 inlet conduit 4 check valve
401 ball
402 cavity
403 inlet
404 outlet
5 register
501 screw part
6 power unit body
600 first elongated bore
600' second elongated bore
601 first surface
602 second surface
603 third surface
611 first bore
612 second bore
613 third bore
611' first conduit
612' second conduit
612" second bore of embodiment of FIG. 3
612'" second conduit of embodiment of FIG. 3
613' third conduit
7 solenoid valve
8 pump
9 hydraulic power unit
10 electric motor
11 cylinder
11' piston
12 tank
13 arrow
14 arrow
15 arrow
C actuator port
L longitudinal axis
P pressure port
T tank port

What is claimed is:

1. A combined valve for insertion into an elongated bore of a power unit body of a hydraulic power unit, comprising:
    an elongated carrier for receiving a relief and a check valve,
    a register arranged at a first axial position of a longitudinal axis of the carrier for calibration of the relief valve;
    a check valve coupled to the carrier at a second axial position along the longitudinal axis of the carrier;
    a relief valve coupled to the carrier at a third axial position along the longitudinal axis of the carrier;
    wherein a minimal distance between the first and the second axial position is less than a minimal distance between the first and the third axial position.

2. The combined valve according to claim 1, wherein the relief valve comprises a compressible contrast spring and the register is configured to compress and/or decompress the contrast spring,
    wherein the register and/or the carrier are/is rotatable with respect to the contrast spring.

3. The combined valve according to claim 1, wherein the check valve comprises an actuator port, the relief valve comprises a tank port, and the check valve and the relief valve have a common pressure port located between the actuator port and the tank port,
    wherein the actuator port, the pressure port and the tank port are arranged along an axis parallel to the longitudinal axis of the combined valve.

4. The combined valve according to claim 3, wherein the check valve is configured to allow a fluid to flow from the pressure port to the actuator port and/or
    wherein the relief valve is configured to allow a fluid to flow from the pressure port to the tank port once a predetermined pressure is exceeded.

5. The combined valve according to claim 1, wherein the carrier comprises a mounting area for mounting on a power unit, including an external thread.

6. A power unit body for a hydraulic power unit, comprising:
    a first elongated bore extending from a first surface of the power unit body, extending substantially perpendicularly from the first surface of the power unit body, for receiving a combined valve, according to claim 1;
    the combined valve, arranged at least partially in the elongated bore;
    a first, a second and a third bore, each extending from a second surface of the power unit body,
    wherein the first bore forms a conduit connecting an actuator port of the combined valve with the second surface of the power unit body and the third bore forms a conduit connecting a tank port of the combined valve with the second surface of the power unit body.

7. A power unit body according to claim 6, wherein the second bore forms a conduit connecting a pressure port of the combined valve with the second surface of the power unit body and/or wherein the first and the second and the third bore are arranged parallel to one another.

8. A power unit body according to claim 6, comprising:
    a second elongated bore extending from the first surface of the power unit body, extending substantially parallel to the first elongated bore,
    a solenoid valve, arranged at least partially in the second elongated bore,
    wherein the first bore extends into the second elongated bore and/or the third bore extends into the second elongated bore.

9. The power unit body according to claim 6, wherein a carrier of the combined valve is rotatably arranged in the first elongated bore.

10. A hydraulic power unit, comprising:
a power unit body according to claim 6,
a tank fluidly connected to the tank port of the combined valve,
a movable cylinder fluidly connected to the actuator port of the combined valve,
a pump fluidly connected to the pressure port of the combined valve and to the tank, wherein the pump is configured to pump a fluid for controlling a movement of the cylinder
an electric motor drivingly connected to the pump for driving the pump.

* * * * *